US012658454B2

(12) United States Patent
Yano et al.

(10) Patent No.: US 12,658,454 B2
(45) Date of Patent: Jun. 16, 2026

(54) FERRITIC STAINLESS STEEL SHEET FOR CURRENT COLLECTORS FOR SULFIDE-BASED SOLID-STATE BATTERIES, AND METHOD FOR MANUFACTURING SAME

(71) Applicants:JFE STEEL CORPORATION, Tokyo (JP); TOYOTA JIDOSHA KABUSHIKI KAISHA, Toyota (JP)

(72) Inventors: Takayoshi Yano, Tokyo (JP); Shin Ishikawa, Tokyo (JP); Akio Mitsui, Toyota (JP)

(73) Assignees: JFE STEEL CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 678 days.

(21) Appl. No.: 17/624,568

(22) PCT Filed: Jun. 29, 2020

(86) PCT No.: PCT/JP2020/025527

§ 371 (c)(1),
(2) Date: Jan. 3, 2022

(87) PCT Pub. No.: WO2021/006099

PCT Pub. Date: Jan. 14, 2021

(65) Prior Publication Data

US 2022/0263095 A1 Aug. 18, 2022

(30) Foreign Application Priority Data

Jul. 9, 2019 (JP) ................................ 2019-127367

(51) Int. Cl.
H01M 4/66 (2006.01)
C22C 38/00 (2006.01)
(Continued)

(52) U.S. Cl.
CPC ........... H01M 4/669 (2013.01); C22C 38/001 (2013.01); C22C 38/004 (2013.01);
(Continued)

(58) Field of Classification Search
CPC .... H01M 4/669; C22C 38/18–58; C25F 1/06; C25F 3/06
See application file for complete search history.

(56) References Cited

U.S. PATENT DOCUMENTS

2002/0160248 A1 10/2002 Takao et al.
2003/0224236 A1 12/2003 Morita et al.
(Continued)

FOREIGN PATENT DOCUMENTS

CN 103154292 A 6/2013
CN 104137313 A 11/2014
(Continued)

OTHER PUBLICATIONS

Machine translation of JP 2009-167486 A (Year: 2009).*
(Continued)

*Primary Examiner* — Robert S Carrico
(74) *Attorney, Agent, or Firm* — Oliff PLC

(57) ABSTRACT

Provided is a ferritic stainless steel sheet for current collectors for sulfide-based solid-state batteries, which has excellent sulfidation resistance and adhesiveness. The ferritic stainless steel sheet has a component composition containing Cr in an amount of 16% by mass or more, wherein the surface of the ferritic stainless steel sheet has an uneven structure having recessed portions and projecting portions, the average height of the projecting portions is 20 to 50 nm inclusive, the average distance between the projecting portions is 20 to 200 nm inclusive, and the [Cr]/[Fe], i.e., the ratio of the atom concentration of Cr that is present in a form other than the metal form to the atom concentration of Fe
(Continued)

T: VERTEX OF PROTRUSION
V: LOWEST POINT IN RECESS
b: STRAIGHT LINE CONNECTING LOWEST
   POINTS IN RECESSES ADJACENT TO
   (ON BOTH SIDES OF) ONE PROTRUSION
h: DISTANCE BETWEEN STRAIGHT LINE b
   AND VERTEX OF CORRESPONDING
   PROTRUSION

DIRECTION PARALLEL TO
STEEL SHEET SURFACE

STEEL SHEET THICKNESS
(DEPTH) DIRECTION that is present in a form other than the metal form, on the surface of the ferritic stainless steel sheet is 1.0 or more.

4 Claims, 2 Drawing Sheets

(51) Int. Cl.

| | |
|---|---|
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/60* | (2006.01) |
| *C23C 22/50* | (2006.01) |
| *C23F 1/44* | (2006.01) |
| *C25F 1/06* | (2006.01) |
| *C25F 3/06* | (2006.01) |

(52) U.S. Cl.
CPC ............ *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C23C 22/50* (2013.01); *C23F 1/44* (2013.01); *C25F 1/06* (2013.01); *C25F 3/06* (2013.01)

(56) References Cited

U.S. PATENT DOCUMENTS

| | | | |
|---|---|---|---|
| 2008/0233456 A1 | 9/2008 | Ishikawa et al. | |
| 2011/0024002 A1 | 2/2011 | Ishikawa et al. | |
| 2014/0154129 A1 | 6/2014 | Makiishi et al. | |
| 2014/0272668 A1 | 9/2014 | Nagoshi et al. | |
| 2014/0349170 A1 | 11/2014 | Kim et al. | |
| 2015/0037675 A1* | 2/2015 | Izuhara ................. B23K 26/352 |
| | | | 219/121.85 |
| 2016/0197351 A1 | 7/2016 | Tani et al. | |
| 2017/0062843 A1 | 3/2017 | Nagoshi et al. | |
| 2017/0125842 A1 | 5/2017 | Meguro et al. | |
| 2019/0074519 A1 | 3/2019 | Yagishita et al. | |
| 2020/0248332 A1 | 8/2020 | Yano et al. | |
| 2020/0251774 A1 | 8/2020 | Meguro et al. | |
| 2020/0340126 A1 | 10/2020 | Yano et al. | |
| 2021/0273232 A1* | 9/2021 | Nagata ................... C22C 38/008 |

FOREIGN PATENT DOCUMENTS

| | | | | |
|---|---|---|---|---|
| CN | 107849680 A | | 3/2018 |
| EP | 2 626 440 A1 | | 8/2013 |
| EP | 2 800 178 A1 | | 11/2014 |
| EP | 3 916 136 A1 | | 12/2021 |
| JP | 2003-193206 A | | 7/2003 |
| JP | 2003-223904 A | | 8/2003 |
| JP | 2005-302713 A | | 10/2005 |
| JP | 2008-004562 A | | 1/2008 |
| JP | 2008-091225 A | | 4/2008 |
| JP | 2009-231150 A | | 10/2009 |
| JP | 2010-033768 A | | 2/2010 |
| JP | 2010033782 A | * | 2/2010 |
| JP | 2010-280989 A | | 12/2010 |
| JP | 2011-142037 A | | 7/2011 |
| JP | 2013-152068 A | | 8/2013 |
| JP | 5334485 B2 | * | 11/2013 |
| JP | 2014-192012 A | | 10/2014 |
| JP | 2014-212029 A | | 11/2014 |
| JP | 2015-513182 A | | 4/2015 |
| JP | 2016-035913 A | | 3/2016 |
| JP | 2016-217752 A | | 12/2016 |
| JP | 2016-219267 A | | 12/2016 |
| JP | WO2018198685 A1 | † | 6/2019 |
| KR | 20150073422 A | † | 7/2015 |
| WO | 2013/018320 A1 | | 2/2013 |
| WO | 2013/080533 A1 | | 6/2013 |
| WO | 2014/156638 A1 | | 10/2014 |
| WO | 2016/168649 A2 | | 10/2016 |
| WO | 2017/081834 A1 | | 5/2017 |
| WO | 2018/198685 A1 | | 11/2018 |
| WO | 2019/082591 A1 | | 5/2019 |

OTHER PUBLICATIONS

Sep. 15, 2020 Search Report issued in International Patent Application No. PCT/JP2020/025527.
Sep. 7, 2023 Office Action issued in Chinese Patent Application No. 202080046708.4.
Sep. 12, 2023 Office Action issued in Korean Patent Application No. 10-2021-7041927.
Jan. 19, 2023 Office Action issued in Chinese Patent Application No. 202080046708.4.
Hara, Nobuyoshi, "Recent Advances in Studies on Passivity and Localized Corrosion of Stainless Steels", Materia Japan, The Japan Institute of Metals and Materials, May 2016, vol. 55, No. 5, pp. 207-214.
Jun. 10, 2022 Extended Search Report issued in European Patent Application No. 20836836.5.
Jul. 19, 2024 Notice of Allowance issued in U.S. Appl. No. 17/623,680.

* cited by examiner
† cited by third party

T: VERTEX OF PROTRUSION
V: LOWEST POINT IN RECESS
b: STRAIGHT LINE CONNECTING LOWEST
    POINTS IN RECESSES ADJACENT TO
    (ON BOTH SIDES OF) ONE PROTRUSION
h: DISTANCE BETWEEN STRAIGHT LINE b
    AND VERTEX OF CORRESPONDING
    PROTRUSION

DIRECTION PARALLEL TO
STEEL SHEET SURFACE

STEEL SHEET THICKNESS
(DEPTH) DIRECTION

ACTIVE POTENTIAL REGION

PASSIVE POTENTIAL REGION

TRANSPASSIVE POTENTIAL REGION

POTENTIAL WITH RESPECT TO REFERENCE ELECTRODE
(V vs. Ag/AgCl)

FERRITIC STAINLESS STEEL SHEET FOR CURRENT COLLECTORS FOR SULFIDE-BASED SOLID-STATE BATTERIES, AND METHOD FOR MANUFACTURING SAME

TECHNICAL FIELD

The present invention relates to a ferritic stainless steel sheet for a current collector in a sulfide-based solid-state battery and a method for manufacturing the ferritic stainless steel sheet.

BACKGROUND ART

From the viewpoint of global environmental protection, production of electric vehicles (EVs) equipped with a lithium ion secondary battery (LIB) has been recently increasing. For further spread of such electric vehicles, improvements on an LIB are required such as further increase in the energy density, reduction in the charging time, and extension of the battery life. For this reason, sulfide-based solid electrolytes have been researched and developed.

For example, sulfide-based solid electrolytes such as $Li_2S$—$P_2S_5$-based solid electrolytes and LGPS (Li, Ge, P, S)-based solid electrolytes are expected as an electrolyte for an all-solid-state battery because such sulfide-based solid electrolytes have as high Li ion conductivity as that of an electrolytic solution. An all-solid-state battery in which a sulfide-based solid electrolyte is used is also referred to as a sulfide-based solid-state battery.

However, in the case of using a sulfide-based solid electrolyte as described above, corrosion of the current collector due to the sulfide is concerned. In the case of using a material having low sulfidation resistance in a current collector, deterioration of the performance and the safety in the battery is concerned.

For example, Patent Literature 1 discloses stainless steel as a material of a positive electrode current collector in a sulfide-based solid-state battery, and particularly discloses SUS304, SUS304L, SUS316, and SUS316L.

Patent Literature 2 discloses SUS316L as a material of a negative electrode current collector in a sulfide-based solid-state battery.

CITATION LIST

Patent Literatures

Patent Literature 1: JP 2011-142037 A
Patent Literature 2: JP 2016-35913 A

SUMMARY OF INVENTION

Technical Problems

SUS304, SUS304L, SUS316, and SUS316L that are disclosed in Patent Literatures 1 and 2 are austenitic stainless steel.

In the case of using stainless steel as a current collector, the stainless steel sheet is to have a thickness of 5 to 30 μm. However, austenitic stainless steel is significantly work-hardened during rolling and hence requires the increased number of rolling passes, addition of intermediate annealing, and re-rolling after being softened once. This causes deterioration of the productivity, increase in the manufacturing cost, and the like.

Therefore, the present inventors have studied application of a ferritic stainless steel that is free of work hardening. Specifically, the present inventors have studied applicability of various ferritic stainless steel sheets for a current collector in a sulfide-based solid-state battery.

As a result, it has been found that the ferritic stainless steel sheets have insufficient sulfidation resistance in some cases in an environment in which use of a current collector in a sulfide-based solid-state battery is simulated. That is, there is a concern that the reaction between steel and sulfide leads to deterioration of the battery characteristics of the sulfide-based solid-state battery.

Furthermore, it has been found that the adhesion between the ferritic stainless steel sheet and the sulfide-based solid electrolyte becomes insufficient in some cases in long-term use.

The cause of the deterioration of the battery characteristics and the adhesion is not clear, but the present inventors consider as follows. As a result of the reaction between steel and sulfide, a thick reaction layer of the steel and the sulfide is formed at the interface between the steel surface and the sulfide-based solid electrolyte, or the sulfide-based solid electrolyte itself deteriorates. As a result, the adhesion also deteriorates at the interface between the steel and the sulfide-based solid electrolyte. Therefore, it is considered that the battery characteristics and the adhesion deteriorate.

The present invention has been made in view of the above, and an object of the present invention is to provide a ferritic stainless steel sheet having excellent sulfidation resistance and excellent adhesion for a current collector in a sulfide-based solid-state battery.

Furthermore, the present invention aims at providing a method for manufacturing the ferritic stainless steel sheet for a current collector in a sulfide-based solid-state battery.

Solution to Problems

The present inventors have made an intensive study in order to achieve the above-described object.

The environment to which a current collector in a sulfide-based solid-state battery is exposed is not clarified in many respects, and is a special environment in which moisture and oxygen are not present or are present in an extremely small amount, and a potential can be applied in the range of 0.0 to 5.0 V (vs. $Li/Li^+$) (hereinafter, also referred to as "battery environment").

The present inventors have conceived that, in the above-described battery environment, the sulfidation resistance deteriorates in a case where an Fe and Cr oxide film (oxide film in which an Fe oxide and a Cr oxide are mixed) formed on the surface of the ferritic stainless steel sheet is unstable.

Therefore, for suppression of deterioration of the sulfidation resistance, the present inventors have considered that if the oxide film on the surface of the ferritic stainless steel sheet can be improved, the sulfidation resistance can be ensured in the battery environment.

The present inventors have specifically considered that an Fe and Cr oxide film that is thermodynamically more stable than a sulfide of Fe or Cr as a constituent element of the ferritic stainless steel sheet should be formed on the surface of the ferritic stainless steel sheet stably and densely in order to suppress sulfurization of the ferritic stainless steel sheet.

Furthermore, the present inventors have conceived that the proportion of a Cr oxide should be raised in the oxide film on the surface of the ferritic stainless steel sheet because a Cr oxide is thermodynamically more stable than an Fe oxide.

The present inventors have further studied on the basis of this consideration. As a result, the present inventors have found that a stable and dense Fe and Cr oxide film can be formed on the surface of a stainless steel sheet to effectively suppress sulfurization of Fe and Cr when the ratio of the atomic concentration of Cr present in a form other than a metal to the atomic concentration of Fe present in a form other than a metal on the surface of the ferritic stainless steel sheet is a predetermined value or more.

In addition, when a ferritic stainless steel sheet is used for a current collector in a sulfide-based solid-state battery, the adhesion between the sulfide-based solid electrolyte and the current collector is important. Good adhesion leads to extension of the battery life and the safety of the battery.

The present inventors have further studied this point. As a result, the present inventors have found that the adhesion between the ferritic stainless steel sheet and the sulfide-based solid electrolyte can be improved by forming a predetermined uneven structure on the surface of the ferritic stainless steel sheet.

The present inventors have further studied and completed the present invention based on the above-described findings. That is, the configuration of the present invention is as follows.

[1] A ferritic stainless steel sheet for a current collector in a sulfide-based solid-state battery, wherein the ferritic stainless steel sheet has a chemical composition containing 16 mass % or more of Cr;

wherein a surface of the ferritic stainless steel sheet has an uneven structure including recesses and protrusions, the protrusions having an average height of 20 nm or more and 50 nm or less and an average interval of 20 nm or more and 200 nm or less between the protrusions; and wherein [Cr]/[Fe] that is a ratio of an atomic concentration of Cr present in a form other than a metal on the surface of the ferritic stainless steel sheet to an atomic concentration of Fe present in a form other than a metal on the surface of the ferritic stainless steel sheet is 1.0 or more.

[2] A method for manufacturing the ferritic stainless steel sheet for a current collector in a sulfide-based solid-state battery according to [1] above, the method comprising:

preparing a raw material ferritic stainless steel sheet;

removing an oxide film from a surface of the raw material ferritic stainless steel sheet;

etching the raw material ferritic stainless steel sheet, from which the oxide film has been removed, in an active potential region of the raw material ferritic stainless steel sheet; and subjecting the raw material ferritic stainless steel sheet which has been etched to immersing in an oxidizing solution or to electrolyzing in an oxidizing solution and in a passive potential region of the raw material ferritic stainless steel sheet.

Advantageous Effects of Invention

According to the present invention, it is possible to obtain a ferritic stainless steel sheet having excellent sulfidation resistance and excellent adhesion for a current collector in a sulfide-based solid-state battery.

DESCRIPTION OF EMBODIMENTS

Figure 1:
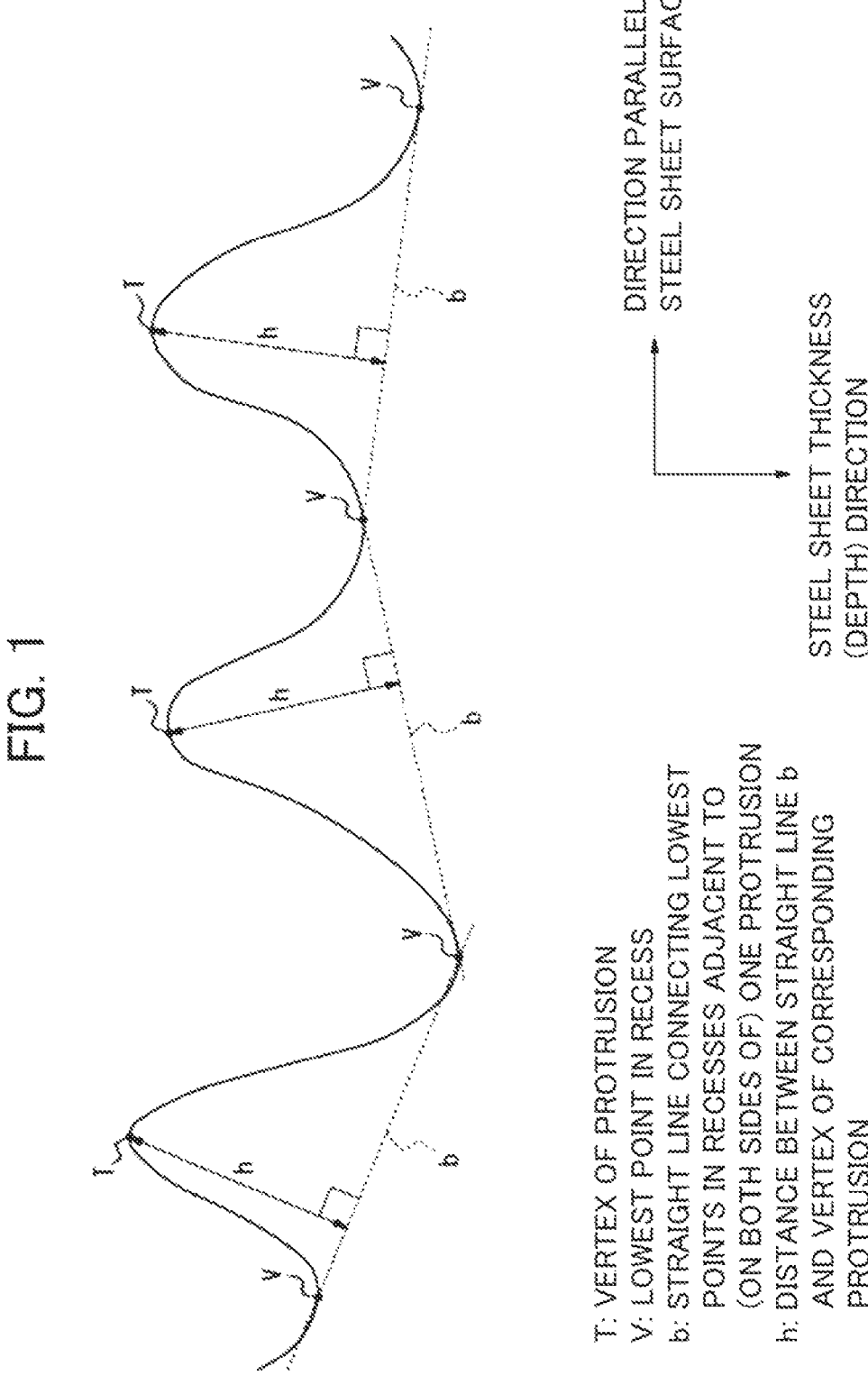
FIG. 1 is a schematic view showing a method of measuring the heights of protrusions.

In the present description, a numerical range represented using "to" means a range including numerical values described before and after "to" as a lower limit value and an upper limit value.

In the present description, a "ferritic stainless steel sheet for a current collector in a sulfide-based solid-state battery" is also simply referred to as a "ferritic stainless steel sheet".

(1) Ferritic Stainless Steel Sheet for Current Collector in Sulfide-Based Solid-State Battery Hereinafter, a ferritic stainless steel sheet according to an embodiment of the present invention (hereinafter, also simply referred to as "the present invention" for convenience) will be described in detail.

[Ratio of Atomic Concentration of Cr Present in Form Other than Metal to Atomic Concentration of Fe Present in Forms Other than Metal on Surface of Ferritic Stainless Steel Sheet: 1.0 or More]

On the surface of the ferritic stainless steel sheet, the ratio of the atomic concentration of Cr present in a form other than a metal to the atomic concentration of Fe present in a form other than a metal (hereinafter, also referred to as [Cr]/[Fe]) is 1.0 or more.

As a result, a stable and dense Fe and Cr oxide film can be formed on the surface of the ferritic stainless steel sheet, and sulfurization of Fe and Cr can be effectively suppressed to obtain high sulfidation resistance even in a special battery environment of a sulfide-based solid-state battery. [Cr]/[Fe] is preferably 1.2 or more.

From the viewpoint of forming a stable and dense Fe and Cr oxide film on the surface of the ferritic stainless steel sheet, larger [Cr]/[Fe] is more advantageous. Therefore, the upper limit of [Cr]/[Fe] is not particularly limited, but the upper limit is usually about 20.

The term "form other than a metal" refers to a form of at least one selected from the group consisting of oxides and hydroxides. Specific examples of the form of Cr include $CrO_2$, $Cr_2O_3$, $CrOOH$, $Cr(OH)_3$, and $CrO_3$. Specific examples of the form of Fe include FeO, $Fe_3O_4$, $Fe_2O_4$, and FeOOH.

Here, [Cr]/[Fe] can be determined as follows.

First, the surface of the ferritic stainless steel sheet is measured through X-ray photoelectron spectroscopy (XPS). More specifically, a 10 mm square sample is cut out from a ferritic stainless steel sheet, and this sample is measured with an X-ray photoelectron spectrometer (X-tool manufactured by ULVAC-PHI, Inc.) under the condition of a take-off angle of 45 degrees using an Al—Kα monochromatic X-ray source. Thus, peaks of Cr and Fe are obtained.

The obtained peaks of Cr and Fe are separated into peaks of Cr and Fe that are present in a form of a metal and peaks of Cr and Fe that are present in a form other than a metal. To separate the peaks, the background of the spectrum is excluded with the Shirley method, and a Gauss-Lorentz composite function (percentage of Lorentz function: 30%) is used.

From the separated peaks, the atomic concentration of Cr present in a form other than a metal and the atomic concentration of Fe present in a form other than a metal are calculated.

Then, the atomic concentration of Cr present in a form other than a metal is divided by the atomic concentration of Fe present in a form other than a metal.

[Average Height of Protrusions in Uneven Structure on Surface of Ferritic Stainless Steel Sheet: 20 nm or More and 50 nm or Less]

The uneven structure of a surface on the ferritic stainless steel sheet has the average height of protrusions of 20 nm or more and 50 nm or less from the viewpoint of obtaining excellent adhesion.

If the average height of the protrusions is less than 20 nm, the difference in height between the recesses and the protrusions is excessively small, so that an anchor effect cannot be obtained at the interface between the surface of the ferritic stainless steel sheet and the sulfide-based solid electrolyte, resulting in deterioration of the adhesion.

If the average height of the protrusions is more than 50 nm, the amount of dissolution increases during etching, and the etching time eventually increases, being disadvantageous in terms of productivity.

Therefore, the average height of the protrusions is 20 nm or more and 50 nm or less. The average height of the protrusions is preferably 25 nm or more. The average height of the protrusions is preferably 40 nm or less, more preferably 35 nm or less, and still more preferably 30 nm or less.

The average height of the protrusions is determined as follows.

First, a thin film sample for cross-section observation is prepared from a ferritic stainless steel sheet using a focused ion-beam machining device (FIB, Versa 3D DualBeam manufactured by FEI Company).

Next, the prepared thin film sample for cross-section observation (also referred to as "steel sheet" in this paragraph) is observed using a spherical aberration correction scanning transmission electron microscope (Cs-corrected STEM, JEM-ARM200F manufactured by JEOL Ltd.) at a magnification of 50,000 times in arbitrary 5 visual fields to obtain TEM images. In each obtained TEM image, the surface of the steel sheet is confirmed, lowest points v (lowest points in the steel sheet thickness (depth) direction) in recesses adjacent to (on both sides of) one protrusion are connected by a straight line b as shown in FIG. 1, and the distance h between the straight line b and the vertex T (vertex in the steel sheet thickness (depth) direction) of this protrusion is determined. The determined distance h is regarded as the height of this protrusion.

In this way, the height is determined for each protrusion on the surface of the steel sheet observed in each obtained TEM image, and the (arithmetic) average value of the determined heights of the protrusions is regarded as the average height of the protrusions. A portion having a height of less than 10 nm is not regarded as a protrusion, and is excluded from the calculation of the average value.

[Average Interval of Protrusions in Uneven Structure on Surface of Ferritic Stainless Steel Sheet: 20 nm or More and 200 nm or Less]

The average interval between the protrusions on the surface of the ferritic stainless steel sheet (hereinafter, also simply referred to as "steel sheet surface") is 20 nm or more and 200 nm or less in order to obtain excellent adhesion.

If the average interval between the protrusions is less than 20 nm, the recesses and the protrusions are excessively fine, so that an anchor effect cannot be obtained at the interface between the steel sheet surface and the sulfide-based solid electrolyte, resulting in deterioration of the adhesion.

If the average interval between the protrusions is more than 200 nm, the number of the recesses and the protrusions is excessively small, so that an anchor effect cannot be obtained at the interface between the steel sheet surface and the sulfide-based solid electrolyte, resulting in deterioration of the adhesion.

Therefore, the average interval between the protrusions is 20 nm or more and 200 nm or less. The average interval between the protrusions is preferably 100 nm or more. The average interval between the protrusions is preferably 180 nm or less.

The average interval between the protrusions is determined as follows.

First, in each TEM image obtained as described above, a line segment (length: 1 μm) is arbitrarily drawn in a direction parallel to the steel sheet surface (direction perpendicular to the steel sheet thickness (depth) direction), and the number of the protrusions (the number of the vertices of the above-described protrusions) is measured in the projection region of the line segment in the steel sheet thickness (depth) direction. Then, the length of the line segment (1 μm) is divided by the measured number of the protrusions, and the obtained value is regarded as the interval between the protrusions.

Next, the intervals between the protrusions determined in the TEM images are (arithmetically) averaged, and the obtained value is regarded as the average interval between the protrusions. A portion having a height of less than 10 nm is not regarded as a protrusion, and is excluded from the measurement of the number of the protrusions.

[Chemical Composition of Ferritic Stainless Steel Sheet]

The ferritic stainless steel sheet of the present invention has a chemical composition containing 16 mass % or more of Cr. Cr has an effect of improving the sulfidation resistance. When the Cr content is 16 mass % or more and immersing or electrolyzing described below is performed, a stable Cr oxide film is formed on the surface of the ferritic stainless steel sheet to improve the sulfidation resistance. Thus, even when used for a current collector in a sulfide-based solid-state battery, the ferritic stainless steel sheet of the present invention can withstand long-term use.

In the ferritic stainless steel sheet of the present invention, a component other than Cr is not particularly limited, but preferable examples of the chemical composition include the following chemical compositions.

[Preferable Chemical Composition of Ferritic Stainless Steel Sheet]

Hereinafter, a preferable chemical composition in the ferritic stainless steel sheet of the present invention (hereinafter, also referred to as "preferable chemical composition of the present invention" for convenience) will be described. The notation regarding the chemical composition means "mass %" unless otherwise specified.

<Basic Components>

The ferritic stainless steel sheet of the present invention preferably has a chemical composition containing, C in an amount of 0.001 to 0.050 mass %, Si in an amount of 0.01 to 2.00 mass %, Mn in an amount of 0.01 to 1.00 mass %, P in an amount of 0.050 mass % or less, S in an amount of 0.010 mass % or less, Cr in an amount of 16.00 to 32.00 mass %, Ni in an amount of 0.01 to 4.00 mass %, Al in an amount of 0.001 to 0.150 mass %, N in an amount of 0.050 mass % or less, and a remaining part consisting of Fe and inevitable impurities.

C: 0.001 to 0.050%

C combines with Cr in the stainless steel and precipitates as a Cr carbide at the grain boundary to form a Cr-depleted layer, thus leading to deterioration of the corrosion resistance. Therefore, from the viewpoint of corrosion resistance, a smaller C content is more preferable, and the C content is preferably 0.050% or less. The C content is more preferably 0.030% or less, and still more preferably 0.020% or less.

The lower limit of the C content is not particularly limited. However, excessive reduction in the C content leads to an increase in the manufacturing cost, and therefore the lower limit of the C content is preferably 0.001%.

Si: 0.01 to 2.00%

Si has an effect of deoxidation and is added in the melting and refining stage of stainless steel. This effect is obtained at a content of 0.01% or more. Therefore, the Si content is preferably 0.01% or more.

However, if Si is excessively contained, the stainless steel is hardened, and the ductility deteriorates. Therefore, the Si content is preferably 2.00% or less. The Si content is more preferably 1.00% or less, and still more preferably 0.60% or less.

Mn: 0.01% to 1.00% or Less

Mn has an effect of deoxidation and is added in the melting and refining stage of stainless steel. This effect is obtained at a content of 0.01% or more. Therefore, the Mn content is preferably 0.01% or more.

However, if the Mn content is more than 1.00%, the corrosion resistance tends to deteriorate. Therefore, the Mn content is preferably 1.00% or less. The Mn content is more preferably 0.60% or less.

P: 0.050% or Less

P causes deterioration of the ductility, and therefore, a smaller P content is more preferable. However, if the P content is 0.050% or less, significant deterioration of the ductility is not caused. Therefore, the P content is preferably 0.050% or less. The P content is more preferably 0.040% or less.

The lower limit of the P content is not particularly limited. However, excessive removal of P leads to an increase in the manufacturing cost, and therefore the lower limit of the P content is preferably about 0.010%.

S: 0.010% or Less

S combines with Mn to form MnS. The MnS serves as a starting point for corrosion to cause deterioration of the corrosion resistance. However, if the S content is 0.010% or less, significant deterioration of the corrosion resistance is not caused. Therefore, the S content is preferably 0.010% or less.

The lower limit of the S content is not particularly limited. However, excessive removal of S leads to an increase in the manufacturing cost, and therefore the lower limit of the S content is preferably about 0.001%.

Cr: 16.00% or More and 32.00% or Less

As described above, Cr has an effect of improving the sulfidation resistance. When the Cr content is 16% or more and immersing or electrolysing described below is performed, a stable Cr oxide film is formed on the surface of the ferritic stainless steel sheet to improve the sulfidation resistance. Thus, even when used for a current collector in a sulfide-based solid-state battery, the ferritic stainless steel sheet of the present invention can withstand long-term use. Therefore, the Cr content is 16% or more.

The Cr content is preferably 16.00% or more, more preferably 17.00% or more, and still more preferably 18.00% or more.

Meanwhile, when the Cr content is more than 32.00%, the toughness deteriorates due to precipitation of a σ phase in some cases. Therefore, the Cr content is preferably 32.00% or less. The Cr content is more preferably 25.00% or less.

Ni: 0.01 to 4.00%

Ni has an effect of contributing to improvement in the corrosion resistance. This effect is obtained at a Ni content of 0.01% or more. However, when the Ni content is more than 4.00%, the susceptibility to stress corrosion cracking is increased. Furthermore, Ni is so expensive as to increase the cost. Therefore, the Ni content is preferably in the range of 0.01 to 4.00%. The Ni content is more preferably 0.10% or more. The Ni content is more preferably 2.00% or less, and still more preferably 0.50% or less.

Al: 0.001 to 0.150%

Al is used for deoxidation. This effect is obtained at a content of 0.001% or more. Therefore, the Al content is preferably 0.001% or more. However, when the Al content is more than 0.150%, the ductility deteriorates. Therefore, the Al content is preferably 0.150% or less. The Al content is more preferably 0.100% or less.

N: 0.050% or Less

If the N content is more than 0.050%, the ductility deteriorates. Therefore, the N content is preferably 0.050% or less. The N content is more preferably 0.030% or less. The lower limit of the N content is not particularly limited. However, excessive removal of N leads to an increase in the cost, and therefore the lower limit of the N content is preferably about 0.002%.

Although the basic components are described above, the following elements can be appropriately contained in a preferable chemical composition of the present invention as necessary.

<Optional Component (Part 1)>

In a preferable chemical composition of the present invention, at least one selected from the group consisting of Mo in an amount of 0.01 to 2.50 mass %, Cu in an amount of 0.01 to 0.80 mass %, Co in an amount of 0.01 to 0.50 mass %, and W in an amount of 0.01 to 3.00 mass % can be further contained.

Mo: 0.01 to 2.50%

Mo has an effect of stabilizing the Fe and Cr oxide film formed on the surface of the ferritic stainless steel sheet. This effect is preferably obtained at a content of 0.01% or more. However, when the Mo content is more than 2.50%, the ferritic stainless steel sheet is embrittled. Therefore, in the case of containing Mo, the Mo content is preferably 0.01 to 2.50%.

Cu: 0.01 to 0.80%

Cu has an effect of improving the corrosion resistance of the ferritic stainless steel sheet. This effect is preferably obtained at a content of 0.01% or more. However, when the Cu content is more than 0.80%, the hot workability deteriorates, leading to deterioration of the productivity. Therefore, in the case of containing Cu, the Cu content is preferably 0.01 to 0.80%.

Co: 0.01 to 0.50%

Co increases the corrosion resistance. This effect is obtained at a Co content of 0.01% or more. However, if the Co content is more than 0.50%, the workability deteriorates. Therefore, in the case of containing Co, the Co content is preferably in the range of 0.01 to 0.50%. The Co content is more preferably 0.05% or more. The Co content is more preferably 0.30% or less.

W: 0.01 to 3.00%

W increases the corrosion resistance. This effect is obtained at a W content of 0.01% or more. However, when the W content is more than 3.00%, the workability deteriorates. Therefore, in the case of containing W, the W content is preferably in the range of 0.01 to 3.00%. The W content is more preferably 0.80% or less, and still more preferably 0.60% or less. The w content is more preferably 0.05% or more.

<Optional Component (Part 2)>

In a preferable chemical composition of the present invention, at least one selected from the group consisting of Ti in an amount of 0.01 to 0.45 mass %, Nb in an amount of 0.01 to 0.60 mass %, Zr in an amount of 0.01 to 0.40 mass %, V in an amount of 0.01 to 0.30 mass %, Ca in an amount of 0.0003 to 0.0030 mass %, Mg in an amount of 0.0005 to 0.0050 mass %, B in an amount of 0.0003 to 0.0050 mass %, a rare earth metal (REM) in an amount of 0.001 to 0.100 mass %, Sn in an amount of 0.001 to 0.500 mass %, and Sb in an amount of 0.001 to 0.500 mass % can be further contained.

Ti: 0.01 to 0.45%

Ti combines with C and N, and thus prevents excessive precipitation of a Cr carbonitride in the steel to suppress deterioration of the corrosion resistance (sensitization). This effect is obtained at a Ti content of 0.01% or more. Meanwhile, when the Ti content is more than 0.45%, the workability deteriorates. Therefore, in the case of containing Ti, the Ti content is preferably in the range of 0.01 to 0.45%. The Ti content is more preferably 0.10% or more. The Ti content is more preferably 0.40% or less.

Nb: 0.01 to 0.60%

Similarly to Ti, Nb combines with C and N and thus suppresses sensitization. This effect is obtained at an Nb content of 0.01% or more. Meanwhile, when the Nb content is more than 0.60%, the workability deteriorates. Therefore, in the case of containing Nb, the Nb content is preferably in the range of 0.01 to 0.60%. The Nb content is more preferably 0.10% or more. The Nb content is more preferably 0.40% or less.

Zr: 0.01 to 0.40%

Similarly to Ti and Nb, Zr combines with C and N included in the steel and thus suppresses sensitization. This effect is obtained at a Zr content of 0.01% or more. Meanwhile, when the Zr content is more than 0.40%, the workability deteriorates. Therefore, in the case of containing Zr, the Zr content is preferably in the range of 0.01 to 0.40%. The Zr content is more preferably 0.03% or more. The Zr content is more preferably 0.30% or less.

V: 0.01 to 0.30%

Similarly to Nb and Zr, V combines with C and N included in the steel and thus suppresses deterioration of the corrosion resistance (sensitization). This effect is obtained at a V content of 0.01% or more. Meanwhile, when the V content is more than 0.30%, the workability deteriorates. Therefore, in the case of containing V, the V content is preferably in the range of 0.01 to 0.30%. The V content is more preferably 0.20% or less, still more preferably 0.15% or less, and particularly preferably 0.10% or less.

Ca: 0.0003 to 0.0030%

Ca improves the castability to enhance the manufacturability. This effect is obtained at a Ca content of 0.0003% or more. However, when the Ca content is more than 0.0030%, Ca combines with S to form CaS, and causes deterioration of the corrosion resistance. Therefore, in the case of containing Ca, the Ca content is preferably in the range of 0.0003 to 0.0030%. The Ca content is more preferably 0.0020% or less.

Mg: 0.0005 to 0.0050%

Mg acts as a deoxidizer. This effect is obtained at a Mg content of 0.0005% or more. However, when the Mg content is more than 0.0050%, the toughness of the steel may deteriorate, leading to deterioration of the manufacturability. Therefore, in the case of containing Mg, the Mg content is preferably in the range of 0.0005 to 0.0050%. The Mg content is more preferably 0.0020% or less.

B: 0.0003 to 0.0050%

B improves the secondary working embrittlement. This effect is obtained at a B content of 0.0003% or more. However, when the B content is more than 0.0050%, a precipitate containing B is generated to cause deterioration of the workability. Therefore, in the case of containing B, the B content is preferably in the range of 0.0003 to 0.0050%. The B content is more preferably 0.0005% or more. The B content is more preferably 0.0030% or less.

Rare earth metal (REM): 0.001 to 0.100%

A rare earth metal (REM: an element of atomic number 57 to 71, such as La, Ce, or Nd) has an effect of deoxidation. This effect is obtained at a REM content of 0.001% or more. However, when the REM content is more than 0.100%, the hot workability deteriorates. Therefore, in the case of containing a REM, the REM content is preferably in the range of 0.001 to 0.100%. The REM content is more preferably 0.010% or less.

Sn: 0.001 to 0.500%

Sn has an effect of suppressing surface roughness after working. This effect is obtained at an Sn content of 0.001% or more. However, when the Sn content is more than 0.500%, the hot workability deteriorates. Therefore, in the case of containing Sn, the Sn content is preferably in the range of 0.001 to 0.500%. The Sn content is more preferably 0.010% or more. The Sn content is more preferably 0.200% or less.

Sb: 0.001 to 0.500%

Similarly to Sn, Sb has an effect of suppressing surface roughness after working. This effect is obtained at an Sb content of 0.001% or more. However, when the Sb content is more than 0.500%, the workability deteriorates. Therefore, in the case of containing Sb, the Sb content is preferably in the range of 0.001 to 0.500%. The Sb content is more preferably 0.010% or more. The Sb content is more preferably 0.200% or less.

<Remaining Part>

The components other than the above-described components in a preferable chemical composition of the present invention are Fe and inevitable impurities.

[Thickness of Ferritic Stainless Steel Sheet]

The ferritic stainless steel sheet of the present invention preferably has a thickness of 5 μm or more and 30 μm or less. When the thickness is less than 5 μm the production efficiency significantly deteriorates, and the manufacturing cost is significantly increased. When the thickness is more than 30 μm, the weight of the battery is increased.

[Application of Ferritic Stainless Steel Sheet]

By using the ferritic stainless steel sheet of the present invention for a current collector in a sulfide-based solid-state battery, it is possible to suppress the reaction between the sulfide-based solid electrolyte and the current collector included in the sulfide-based solid-state battery.

Furthermore, the good adhesion between the sulfide-based solid electrolyte and the current collector leads to improvement in the cycle characteristic of the battery, extension of the battery life, and the safety of the battery.

The ferritic stainless steel sheet of the present invention is suitable for a current collector in a sulfide-based solid-state battery.

(2) Method for Manufacturing Ferritic Stainless Steel Sheet for Current Collector in Sulfide-Based Solid-State Battery Next, a method for manufacturing the ferritic stainless steel sheet of the present invention will be described.

[Preparation of Raw Material Ferritic Stainless Steel Sheet]

A steel slab having a chemical composition as described above is hot-rolled to obtain a hot-rolled sheet. The obtained hot-rolled sheet is annealed and pickled as necessary. Then, the hot-rolled sheet is cold-rolled to obtain a cold-rolled sheet (ferritic stainless steel sheet) having a desired thickness. For example, in the case of the final thickness of 10 μm, the cold-rolled sheet is annealed as necessary, and further cold-rolled to the final thickness.

The conditions for the hot-rolling, the cold-rolling, the hot-rolled sheet annealing, the cold-rolled sheet annealing and the like are not particularly limited, and may be in accordance with a conventional method. After the cold-rolled sheet annealing, pickling may be performed. Bright annealing may be performed instead of the cold-rolled sheet annealing.

The ferritic stainless steel sheet manufactured as described above is prepared as a raw material ferritic stainless steel sheet.

[Removal of Oxide Film]

The oxide film formed in advance on the surface of the above-described raw material ferritic stainless steel sheet (hereinafter, also simply referred to as "oxide film") is removed. The oxide film is removed before the etching described below is performed, whereby an effect of improving the adhesion by the etching in the active potential region can be stably obtained.

Here, examples of the oxide film formed in advance include passive films formed in the atmosphere.

The oxide film may be removed by an anode electrolytic treatment, a cathode electrolytic treatment, or a combination of an anode electrolytic treatment and a cathode electrolytic treatment, and among these treatments, the cathode electrolytic treatment is preferable. The cathode electrolytic treatment is particularly advantageous because the amount of dissolution of the raw material ferritic stainless steel sheet is smaller in the cathode electrolytic treatment than in the anode electrolytic treatment.

The cathode electrolytic treatment may be performed at a current density at which the oxide film on the surface of the raw material ferritic stainless steel sheet can be removed. Specifically, the electrolytic condition is preferably adjusted each time according to the kind of the stainless steel sheet, the thickness of the oxide film formed in advance, the configuration of the electrolyzer, and the like.

For example, in the case of potential control, the cathode electrolytic treatment may be performed under the conditions of a potential of −0.7 V (vs. Ag/AgCl) and a treatment time of 1 minute or more in a 30 g/L sulfuric acid aqueous solution.

The notation "V (vs. Ag/AgCl)" means that the preceding value is a potential with respect to the silver-silver chloride electrode used as a reference electrode, and is hereinafter referred to as "(vs. Ag/AgCl)".

In the case of current control, the cathode electrolytic treatment is preferably performed in the range of a current density of −0.1 to −100 mA/cm$^2$ and a treatment time of 1 to 600 seconds although the current density and the treatment time vary depending on the kind of steel and the thickness of the oxide film.

Although the treatment time varies depending on the current density, for example, in the case of a current density of −0.5 mA/cm$^2$, the oxide film on the surface of the raw material ferritic stainless steel sheet is usually removed with a treatment time of 60 seconds or more. However, a long treatment time causes deterioration of the economic efficiency, and therefore, the treatment time is preferably 600 seconds or less. The treatment time is more preferably 300 seconds or less.

The current density here indicates a value obtained by dividing a current flowing between the raw material ferritic stainless steel sheet as a material to be treated and a counter electrode by a surface area of the material to be treated. In the case of current control, this current density is controlled.

The treatment liquid used in the cathode electrolytic treatment is not particularly limited, and a sulfuric acid aqueous solution is preferable.

The concentration of the treatment liquid should be adjusted so that the conductivity of the treatment liquid is sufficiently high. For example, in the case of a sulfuric acid aqueous solution, the concentration of sulfuric acid is preferably about 10 to 100 g/L.

In the case of using an inexpensive acid such as a regenerated acid, another acid such as hydrofluoric acid or phosphoric acid is sometimes contained as an impurity. The impurity may be contained as long as the concentration of the acid other than sulfuric acid is 5 g/L or less. The concentration of the acid other than sulfuric acid may be 0 g/L.

The treatment temperature is not particularly limited, and is preferably 30 to 85° C.

Using the same treatment liquid for the removal of the oxide film and for the etching described below is advantageous inn terms of the cost. The removal of the oxide film and the etching can be continuously performed in the same electrolytic bath depending on the structure of the electrolytic bath.

[Etching]

The raw material ferritic stainless steel sheet in which the oxide film on the surface has been removed is etched in an active potential region of the raw material ferritic stainless steel sheet.

As the etching of the raw material ferritic stainless steel sheet, etching in one of three potential regions of the active potential region, the passive potential region, and the transpassive potential region can be considered. In the present invention, etching is performed in the active potential region. The reason is as follows.

In the case of etching in the passive potential region, a passive film is formed on the raw material ferritic stainless steel sheet, and therefore, a sufficient etching effect cannot be obtained, and a desired effect of improving the adhesion cannot be obtained.

In the case of etching in the transpassive potential region, the amount of dissolution of the raw material ferritic stainless steel sheet is large, and the dissolution rate is also high. In addition, an oxygen generation reaction may simultaneously occur depending on the potential, and therefore, the etching amount is difficult to control.

In the case of etching in the active potential region, on the other hand, a more sufficient etching effect is obtained than in etching in the passive potential region, and the amount of dissolution of the raw material ferritic stainless steel sheet is smaller and easier to control than in etching in the transpassive potential region.

As described above, in etching in the active potential region, the amount of dissolution of the raw material ferritic stainless steel sheet can be precisely controlled, and furthermore, the shape of the fine uneven structure formed on the surface of the raw material ferritic stainless steel sheet can be controlled on the order of nm. Therefore, etching is performed in the active potential region.

It is possible to control the amount of dissolution in etching by appropriately adjusting the temperature and the concentration of the treatment liquid used in etching (for example, in the case of using a sulfuric acid aqueous solution as the treatment liquid, the sulfuric acid concentration) and the treatment time.

The three potential regions of the active potential region, the passive potential region, and the transpassive potential region are defined as follows.

Figure 2:
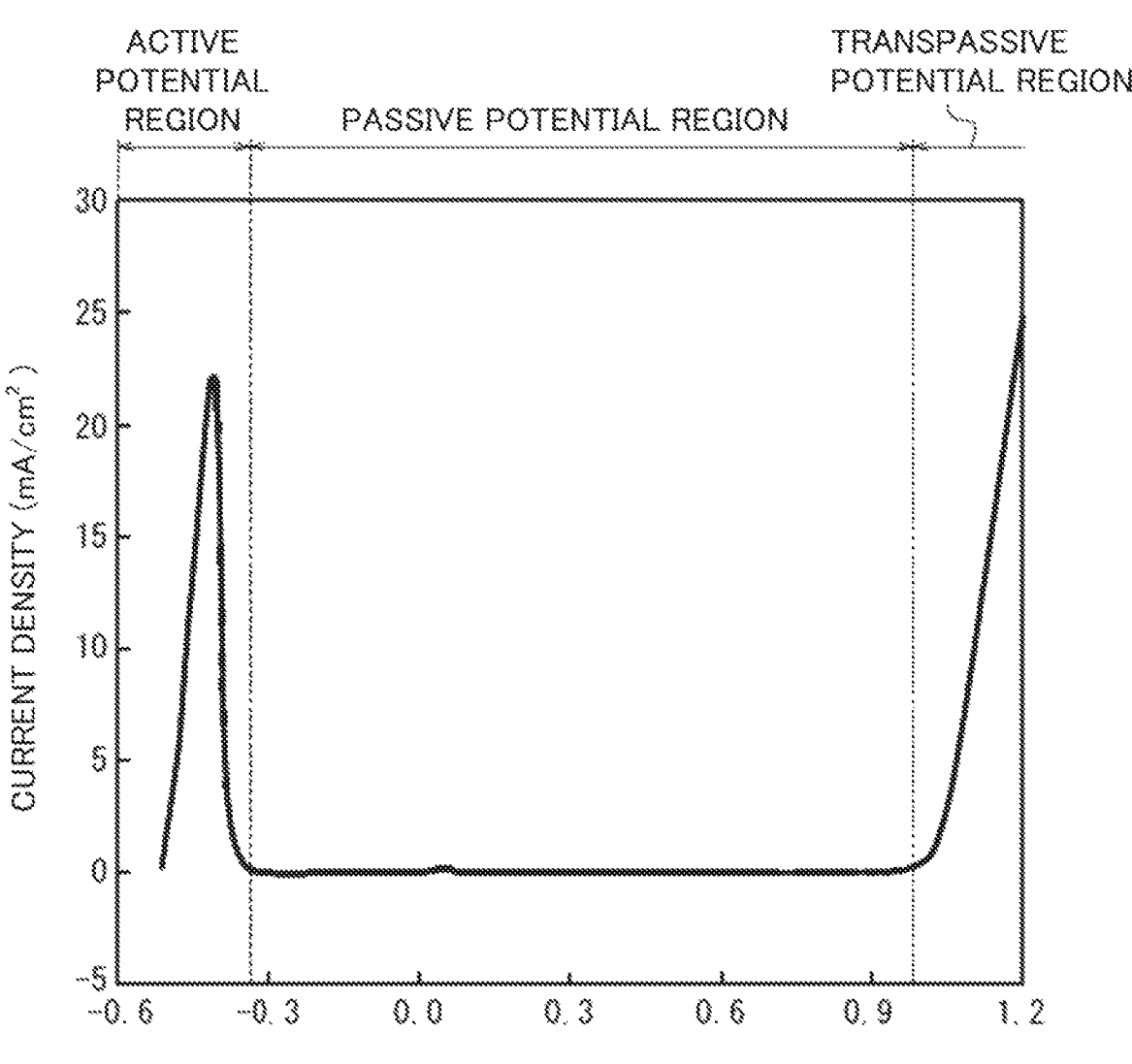
FIG. 2 is a graph showing an example of an anode polarization curve.

As shown in FIG. 2, for example, when a raw material ferritic stainless steel sheet having a chemical composition of Steel No. B in Table 1 described below is polarized in the anode direction from the natural immersion potential, and around when the potential exceeds −0.51 V (vs. Ag/AgCl), the current increases, and the current density eventually increases to reach a maximum value of about +22.0 mA/cm². Then, the current decreases as the potential increases, and when the potential reaches −0.34 V (vs. Ag/AgCl), the current density decreases to $\frac{1}{100}$ or less of the maximum value. This low current state is kept in the potential region of −0.34 V (vs. Ag/AgCl) to +0.97 V (vs. Ag/AgCl), and then the current density rapidly increases again as the potential increases.

FIG. 2 is an anode polarization curve obtained for Steel No. B in Table 1 described below using a silver-silver chloride electrode as a reference electrode in a 30 g/L sulfuric acid aqueous solution under the conditions of 55° C. and a potential scanning speed of 1 mV/s. This potential scanning speed is used to obtain the anode polarization curve.

The potential region in which the current density increases as the initial potential increases is the active potential region; the potential region in which almost no current flows to keep the current density at a low value even if the potential increases is the passive potential region; and the potential region in which, beyond the potential region of the passive potential region, the current density rapidly increases is the transpassive potential region.

Specifically, the active potential region is defined as a potential region that first appears (before the passive potential region described below appears) during increase in potential in an anode polarization curve obtained by polarizing a raw material ferritic stainless steel sheet in a treatment liquid in the anode direction from the natural immersion potential at a scanning speed of 1 mV/s. In the active potential region, the current density increases with the increase in potential, reaches a maximum value (maximum value of the current density in the active potential region), and thereafter decreases to be $\frac{1}{100}$ or less of the maximum value.

The passive potential region is defined as a potential region in which, in the above-described anode polarization curve, almost no current flows even if the potential increases beyond the active potential region (specifically, a potential region in which the current density is maintained at $\frac{1}{100}$ or less of the maximum value).

The transpassive potential region is defined as a potential region in which, beyond the passive potential region, the current rapidly increases as the potential increases.

The active potential region varies depending on the kind of steel of the raw material ferritic stainless steel sheet and the conditions such as the treatment liquid to be used, and therefore it is preferable to acquire an anode polarization curve under these conditions in advance, grasp the potential region as the active potential region, and perform etching.

Specifically, in the case of etching under potential control, the anode polarization curve of the raw material ferritic stainless steel sheet as a material to be treated is acquired in advance, the potential region as the active potential region is grasped, and etching should be performed in the potential region.

For example, in the case of treating steel of the kind B in Table 1 described below with a 30 g/L sulfuric acid aqueous solution, a potential region of −0.51 V to −0.34 V (vs. Ag/AgCl) corresponds to the active potential region, and therefore etching should be performed in this potential region as the active potential region with a treatment time being appropriately adjusted in the range of 1 to 600 seconds.

In the case of etching under current control, etching should be performed in the current density range determined as follows. The relationship between the current density and the electrolytic potential is investigated in advance, and thus the current density range in which electrolysing is performed in the active potential region is grasped.

However, in the case of current control, the appropriate current density varies depending on, for example, the kind of steel of the raw material ferritic stainless steel sheet and the treatment liquid to be used, and therefore adjustment is required each time.

When a raw material ferritic stainless steel sheet as a material to be treated is large, or a coiled material to be treated is subjected to etching, in a manufacturing facility with a large electrolyzer, a reference electrode is difficult to use.

In such cases, etching should be performed at the current density determined as follows. The relationship between the current density and the electrolytic voltage applied between the material to be treated and a counter electrode is confirmed while the current density increases, whereby the current density is confirmed at which etching is performed in the potential region as the active potential region.

For example, a current density before the electrolytic voltage applied between the material to be treated and the counter electrode rapidly increases can be determined as being in the active potential region, while a currently density after the electrolytic voltage applied between the material to be treated and the counter electrode rapidly increased can be determined as being in in the transpassive potential region.

For example, in the case of treating Steel No. B in Table 1 described below with a 30 g/L sulfuric acid aqueous solution, electrolyzing can be performed in a potential region corresponding to the active potential region with the current density being controlled to about 0.01 to 10.00 mA/cm². Therefore, etching should be performed in the range of the current density in this active potential region with a treatment time being appropriately adjusted in the range of 1 to 600 seconds.

The current density here represents a value obtained by dividing a current flowing between the raw material ferritic stainless steel sheet as a material to be treated and the counter electrode by a surface area of the material to be treated. In the case of current control, this current density is controlled.

The treatment liquid used for the etching is preferably a sulfuric acid aqueous solution.

The concentration of the treatment liquid should be adjusted so that the conductivity of the treatment liquid is sufficiently high. For example, in the case of a sulfuric acid aqueous solution, the concentration of sulfuric acid is preferably about 10 to 300 g/L.

A small amount of nitric acid may be added to the treatment liquid for the purpose of, for example, removing smuts generated on the surface of the raw material ferritic stainless steel sheet. However, nitric acid passivates the raw material ferritic stainless steel sheet to suppress an etching effect. Therefore, the concentration of nitric acid is preferably 10 g/L or less. In a case where the treatment liquid is a sulfuric acid aqueous solution, the concentration of nitric acid is preferably equal to or less than the concentration of sulfuric acid. The concentration of nitric acid may be 0 g/L.

An acid other than sulfuric acid and nitric acid in the treatment liquid is preferably reduced as much as possible. In the case of using an inexpensive acid such as a regenerated acid, another acid such as hydrofluoric acid or phosphoric acid is sometimes contained as an impurity. The impurity may be contained as long as the concentration of the acid other than sulfuric acid and nitric acid is 5 g/L or less. The concentration of the acid other than sulfuric acid may be 0 g/L.

The treatment temperature is not particularly limited, and is preferably 30 to 85° C. In a case where the removal of the oxide film and the etching can be performed with the same treatment liquid at the same treatment temperature, the removal of the oxide film and the etching can be continuously performed using the same electrolytic bath.

The etching can also be performed only by immersing without electrolyzing in the treatment liquid.

As described above, in etching under potential control or current control, a stable treatment can be expected in which nonuniformity or the like is less likely to occur in the treatment.

Meanwhile, after the removal of the oxide film in the cathode electrolytic treatment, when the raw material ferritic stainless steel sheet is kept to be immersed in the treatment liquid without electrolyzing, the potential of the raw material ferritic stainless steel sheet from which the oxide film has been removed increases to the active potential region, and therefore etching can be performed in the active potential region.

[Immersing or Electrolyzing in Passive Potential Region of Raw Material Ferritic Stainless Steel Sheet in Oxidizing Solution]

The etched raw material ferritic stainless steel sheet is subjected to immersing or electrolyzing in the passive potential region of the raw material ferritic stainless steel sheet (hereinafter, also simply referred to as "immersing" or "electrolyzing") in an oxidizing solution.

As a result, the Cr oxide on the surface of the ferritic stainless steel sheet is increased. Thus, even in the above-described special battery environment, sulfurization of Fe and Cr can be effectively suppressed, and high sulfidation resistance can be obtained.

Furthermore, deposits such as smuts formed during the etching are dissolved (removed) by the immersing or the electrolyzing.

After the etching, a large amount of smuts (a mixture containing C, N, S, O, Fe, and Cr as main constituent elements) are generated on the surface of the raw material ferritic stainless steel sheet. If the smuts remain, the sulfidation resistance deteriorates.

Therefore, immersing or electrolyzing is performed after the etching. As a result, [Cr]/[Fe] is increased, and the smuts are removed, so that high sulfidation resistance is obtained.

Examples of the oxidizing solution include a nitric acid aqueous solution and a hydrogen peroxide aqueous solution.

The longer immersing treatment time (immersion time) promotes the removal of the smuts and the like and condensation of the Cr oxide on the surface, but if the immersion time is too long, such effects are saturated, and the productivity deteriorates.

Therefore, the immersing treatment time is preferably 90 minutes or less. The treatment time is more preferably 15 minutes or less. The lower limit of the treatment time is preferably 0.5 minutes or more, and more preferably 1 minute or more.

In the case of using a nitric acid aqueous solution as the oxidizing solution, the concentration of nitric acid is preferably 10 to 400 g/L.

In the case of using a hydrogen peroxide aqueous solution as the oxidizing solution, the concentration of hydrogen peroxide is preferably 10 to 300 g/L.

Any acid contained as an impurity in the oxidizing solution in the concentration of 10 g/L or less is acceptable. The lower limit of the concentration is not particularly limited, and may be 0 g/L.

The treatment temperature in the immersing is not particularly limited, and is preferably 30 to 60° C.

In a case where the electrolyzing is performed, the potential should be adjusted to a potential region in which the raw material ferritic stainless steel sheet is passivated. In particular, the potential is preferably set to a potential region in which components other than Cr, such as Fe and Ni included in the raw material ferritic stainless steel sheet, are dissolved and Cr is not dissolved.

The potential region (passive potential region) in which the raw material ferritic stainless steel sheet is passivated varies depending on the used oxidizing solution (electrolytic solution) and the kind of steel of the raw material ferritic stainless steel sheet, and therefore the potential is preferably adjusted according to the electrolytic solution and the kind of steel.

For example, in the case of treating Steel No. F in Table 1 described below using a 50 g/L nitric acid aqueous solution, the electrolysing is preferably performed with a potential in the range of +0.40 to +0.60 V (vs. Ag/AgCl).

The longer electrolyzing treatment time (electrolysis time) promotes condensation of Cr present in a form other than a metal on the surface of the raw material ferritic stainless steel sheet, but if the treatment time is too long, this effect is saturated, and the productivity deteriorates.

Therefore, the electrolyzing treatment time is preferably 90 minutes or less. The electrolysis time is more preferably 15 minutes or less. The lower limit of the treatment time is preferably 0.5 minutes or more, and more preferably 1 minute or more.

The treatment temperature in the electrolyzing is not particularly limited, and is preferably 30 to 70° C.

During the immersing or the electrolyzing, when the surface of the raw material ferritic stainless steel sheet as a material to be treated is rubbed with a nonwoven fabric wiper or the like as necessary, the smuts and the like are easily removed, and as a result, an effect of further improving the sulfidation resistance can be obtained.

According to the present invention, it is possible to obtain, with high productivity, a ferritic stainless steel sheet having excellent sulfidation resistance and excellent adhesion for a current collector in a sulfide-based solid-state battery.

EXAMPLES

Stainless steel sheets (raw material ferritic stainless steel sheets) having a sheet thickness of 10 µm that had chemical compositions (with the remaining part being Fe and inevitable impurities) described in Table 1 below were prepared.

The prepared stainless steel sheets were subjected to removal of the oxide film, etching, and immersing or electrolysing under the conditions shown in Table 2 below (Samples No. 4 to No. 9).

A sample subjected to none of the above-described treatments was regarded as Sample No. 1, a sample subjected to only immersing was regarded as Sample No. 2, and a sample subjected to only removal of the oxide film and etching was regarded as Sample No. 3. The notation in the columns of manufacturing conditions in Table 2 below indicates that the treatment was not performed.

The current density in Table 2 below is a value obtained by dividing a current flowing between the material to be treated (raw material ferritic stainless steel sheet) and the counter electrode by a surface area of the material to be treated.

In Samples No. 3 to No. 9, the removal of the oxide film was performed by cathode electrolytic treatment under current control.

In Samples No. 3 to No. 4 and No. 6 to No. 9, etching was performed under current control. Before the etching, the relationship between the current density and the electrolytic voltage applied between the material to be treated and the counter electrode was investigated in advance for each condition and for each kind of steel, and it was confirmed that in the case of current control, the active potential region was attained by adjusting the current density to +0.8 or +1.0 $mA/cm^2$ under any condition.

After the etching, Sample No. 6 in Table 2 below was electrolyzed under the following conditions. That is, electrolyzing was performed using a 50 g/L nitric acid aqueous solution under the conditions of a treatment temperature of 55° C., a potential of +0.50 V (vs. Ag/AgCl), and a treatment time of 60 seconds. In the stainless steel sheet of Steel No. B, the potential of +0.50 V (vs. Ag/AgCl) was in the passive potential region.

Using the ferritic stainless steel sheets manufactured as described above, the sulfidation resistance and the adhesion were evaluated in the following manner in simulation of the battery environment of a sulfide solid-state battery.

[Evaluation of Sulfidation Resistance]

First, $Li_2S$ and $P_2S_5$ were mixed at a molar ratio of $Li_2S:P_2S_5$ 70:30 in a mortar in an argon atmosphere having a dew point of −70° C. or less to obtain a mixture. The obtained mixture was subjected to mechanical milling using a ball mill under the conditions of 25° C. and 500 rpm for 20 hours, and then subjected to a heat treatment at 200° C. for 1.5 hours. The mixture after the heat treatment was pressurized to be formed at 100 MPa to prepare a circular pellet of a sulfide-based solid electrolyte having a thickness of 500 μm and a diameter of 11.3 mm.

Next, each of the prepared ferritic stainless steel sheets was cut into a circular shape having a diameter of 11.3 mm, the prepared sulfide-based solid electrolyte was placed thereon. On the resulting product, a circular counter electrode in which an Li metal foil is bonded to a Cu foil and which has a thickness of 100 μm and a diameter of 11.3 mm was placed so that the Li metal foil was in contact with the sulfide-based solid electrolyte. The resulting product was pressurized. In this manner, two measurement cells were prepared from each ferritic stainless steel sheet.

The Li metal foil serves as both a counter electrode and a reference electrode. All of the potentials in the following electrochemical measurement were potentials with respect to the reference electrode by V (vs. $Li/Li^+$).

Using the measurement cell prepared above, electrochemical measurement was performed with a scan of potential under the following conditions. More specifically, a test in a potential range assumed to be a positive electrode side (also referred to as a positive electrode-assumed test) and a test in a potential range assumed to be a negative electrode side (also referred to as a negative electrode-assumed test) were performed. In each test, the current density of the ferritic stainless steel sheet was observed during the 150th cycle of scan of potential, and thus the sulfidation resistance of the sulfide-based solid-state battery in the battery environment was evaluated. The initial immersion potential (immersion potential at the start of the test) was about 2.0 to 2.5 V in each test.

If the current density is low in this evaluation, it can be determined that the sulfidation reaction between the ferritic stainless steel sheet and the sulfide-based solid electrolyte has not occurred, and deterioration of the sulfidation resistance in long-term use can be suppressed.

The measurement was performed at 25° C. in an argon atmosphere having a dew point of −70° C. or less.

The measurement cells were separately used for the positive electrode-assumed test and the negative electrode-assumed test.

Method of Scan of Potential (1) One cycle of positive electrode assumed test: immersion potential at start of test→5.0 V→immersion potential at start of test (2) One cycle of negative electrode-assumed test: immersion potential at start of test→0.0 V→immersion potential at start of test Potential: potential V with respect to Li metal foil as counter electrode (vs. $Li/Li^+$)

Scan speed: 5 mV/s

Number of cycles: 150 cycles

The evaluation criteria for the sulfidation resistance were as described below. Table 2 below shows the evaluation results.

(pass): The absolute value of the maximum current density in the 150th cycle is 30 $\mu A/cm^2$ or less in both the positive electrode-assumed test and the negative electrode-assumed test.

(fail): The absolute value of the maximum current density in the 150th cycle is more than 30 $\mu A/cm^2$ in any one or both of the positive electrode-assumed test and the negative electrode-assumed test.

[Evaluation of Adhesion]

The measurement cell used for the evaluation of the sulfidation resistance was disassembled, and the surface of the ferritic stainless steel sheet was observed using a scanning electron microscope (SEM) (accelerating voltage: 3 kV, magnification: 100 times, backscattered electron image) to obtain an SEM image. The obtained SEM image was binarized using image analysis software (Adobe Photoshop (registered trademark)), and thus the residual ratio of the sulfide-based solid electrolyte remaining on the surface of the ferritic stainless steel sheet (area ratio of the sulfide-based solid electrolyte in the SEM image) was calculated. Next, the rate of improvement in adhesion was determined based on the following formula, and the adhesion was evaluated.

$$\text{Rate of improvement in adhesion(\%)} = 100 \times P/Q$$

In the above-described formula, P represents the residual ratio of the sulfide-based solid electrolyte remaining on the surface of each of the ferritic stainless steel sheets of Samples No. 2 to No. 9, and Q represents the residual ratio of the sulfide-based solid electrolyte remaining on the surface of the ferritic stainless steel sheet of Sample No. 1.

The evaluation criteria for adhesion were as follows. Table 2 described below shows the evaluation results.

(pass): Both the ferritic stainless steel sheet used in the positive electrode-assumed test and the ferritic stainless steel sheet used in the negative electrode-assumed test have a rate of improvement in adhesion of 120% or more.

(fail): Any one or both of the ferritic stainless steel sheet used in the positive electrode-assumed test and the ferritic stainless steel sheet used in the negative electrode-assumed test have a rate of improvement in adhesion of less than 120%.

TABLE 1

| Steel | Chemical composition (mass %) | | | | | | | | | | | | | |
| No. | C | Si | Mn | P | S | Cr | Ni | Al | N | Mo | Nb | Ti | Zr | Other components |
|---|---|---|---|---|---|---|---|---|---|---|---|---|---|---|
| A | 0.036 | 0.25 | 0.53 | 0.026 | 0.007 | 16.08 | 0.13 | 0.003 | 0.043 | — | — | — | — | — |
| B | 0.009 | 0.16 | 0.19 | 0.026 | 0.003 | 20.64 | 0.15 | 0.035 | 0.009 | — | — | 0.27 | — | Cu: 0.43 |
| C | 0.012 | 0.12 | 0.17 | 0.021 | 0.003 | 21.05 | 0.13 | 0.033 | 0.011 | 0.53 | — | 0.33 | — | Co: 0.07, V: 0.04 |
| D | 0.005 | 0.11 | 0.13 | 0.024 | 0.001 | 23.41 | 0.29 | 0.092 | 0.011 | — | 0.22 | 0.11 | 0.03 | Ca: 0.0004, B: 0.0005 W: 0.08, Mg: 0.0009, REM: 0.003, Sn: 0.012, Sb: 0.015 |
| E | 0.004 | 0.18 | 0.16 | 0.026 | 0.007 | 30.04 | 0.23 | 0.073 | 0.011 | 1.82 | 0.14 | — | — | — |

TABLE 2

| | | Manufacturing conditions | | | | | | |
| | | Removal of oxide film | | | | Etching | | |
| Sample No. | Steel No. | Treatment liquid | Treatment temperature (° C.) | Current density (mA/cm$^2$) | Treatment time (second) | Treatment liquid | Treatment temperature (° C.) | Current density (mA/cm$^2$) |
|---|---|---|---|---|---|---|---|---|
| 1 | A | — | — | — | — | — | — | — |
| 2 | | — | — | — | — | — | — | — |
| 3 | | 30 g/L sulfuric acid aqueous solution | 55 | −0.8 | 30 | 30 g/L sulfuric acid aqueous solution | 55 | +0.8 |
| 4 | | 30 g/L sulfuric acid aqueous solution | 55 | −0.8 | 30 | 30 g/L sulfuric acid aqueous solution | 55 | +0.8 |
| 5 | | 30 g/L sulfuric acid aqueous solution | 55 | −0.8 | 30 | 30 g/L sulfuric acid aqueous solution | 55 | —*2 |
| 6 | B | 30 g/L sulfuric acid aqueous solution | 55 | −0.8 | 60 | 30 g/L sulfuric acid aqueous solution | 55 | +0.8 |
| 7 | C | 30 g/L sulfuric acid aqueous solution | 55 | −0.8 | 60 | 30 g/L sulfuric acid aqueous solution | 55 | +0.8 |
| 8 | D | 30 g/L sulfuric acid aqueous solution | 55 | −0.8 | 60 | 30 g/L sulfuric acid aqueous solution | 55 | +0.8 |
| 9 | E | 30 g/L sulfuric acid aqueous solution | 55 | −1.0 | 60 | 30 g/L sulfuric acid aqueous solution | 55 | +1.0 |

TABLE 2-continued

| | Manufacturing conditions | | | | | | Average |
| | Etching | | Immersing or electrolyzing | | | | |
| Sample No. | Treatment time (second) | Etching potential | Oxidizing solution | Treatment method | Treatment temperature (° C.) | Treatment time (second) | height of protrusions (nm) |
|---|---|---|---|---|---|---|---|
| 1 | — | — | — | — | — | — | <10*1 |
| 2 | — | — | 300 g/L nitric acid aqueous solution | Immersing | 55 | 60 | <u><10</u>*1 |
| 3 | 30 | Active potential region | — | — | — | — | 32 |
| 4 | 30 | Active potential region | 300 g/L nitric acid aqueous solution | Immersing | 55 | 60 | 32 |
| 5 | 30 | Active potential region | 300 g/L nitric acid solution | Immersing | 55 | 60 | 30 |
| 6 | 60 | Active potential region | 50 g/L nitric acid aqueous solution | Electrolyzing (passive potential region) | 55 | 60 | 29 |
| 7 | 60 | Active potential region | 300 g/L nitric acid aqueous solution | Immersing | 55 | 60 | 31 |
| 8 | 60 | Active potential region | 300 g/L nitric acid aqueous solution | Immersing | 55 | 60 | 29 |
| 9 | 60 | Active potential region | 300 g/L nitric acid aqueous solution | Immersing | 55 | 60 | 28 |

| | Average interval of | | Evaluation results | | |
| Sample No. | protrusions (nm) | [Cr]/[Fe] | Sulfidation resistance | Adhesion | Note |
|---|---|---|---|---|---|
| 1 | <u>—</u>*1 | <u>0.2</u> | x | — | Comparative example |
| 2 | <u>—</u>*1 | 1.2 | o | x | Comparative example |
| 3 | 169 | <u>0.6</u> | x | o | Comparative example |
| 4 | 173 | 1.2 | o | o | Inventive example |
| 5 | 163 | 1.2 | o | o | Inventive example |
| 6 | 143 | 1.3 | o | o | Inventive example |
| 7 | 151 | 1.4 | o | o | Inventive example |
| 8 | 134 | 1.5 | o | o | Inventive example |
| 9 | 122 | 1.7 | o | o | Inventive example |

Notation: The underlines value is out of the range of the present invention.

*1A protrusion having a height of 10 nm or more is not present in the present invention.

*2After the removal of the oxide film, immersing was performaed without current control.

Table 2 described above clarifies the following matters.

(a) In all of the inventive examples, desired sulfidation resistance and desired adhesion were obtained, (b) In Samples No. 1 to No. 3 as comparative examples, it was not possible to obtain both desired sulfidation resistance and desired adhesion.

The invention claimed is:

1. A ferritic stainless steel sheet for a current collector in a sulfide-based solid-state battery, wherein the ferritic stainless steel sheet has a chemical composition containing Cr in an amount in a range of 16 to 32 mass %;

wherein the chemical composition further comprises:

0.001 to 0.050 mass % of C, 0.01 to 0.60 mass % of Si, 0.01 to 0.60 mass % of Mn, 0.050 mass % or less of P, 0.010 mass % or less of S, 0.01 to 0.50 mass % of Ni, 0.001 to 0.150 mass % of Al, and 0.050 mass % or less of N, wherein a surface of the ferritic stainless steel sheet has an uneven structure including recesses and protrusions, the protrusions having an average height of 29 nm or more and 32 nm or less and an average interval of 134 nm or more and 173 nm or less between the protrusions;

wherein [Cr]/[Fe] that is a ratio of an atomic concentration of Cr present in a form other than a metal on the surface of the ferritic stainless steel sheet to an atomic concentration of Fe present in a form other than a metal on the surface of the ferritic stainless steel sheet is within a range of 1.2 to 1.5; and wherein the ferritic stainless steel sheet has a thickness of 5 μm or more and 30 μm or less.

2. A method for manufacturing the ferritic stainless steel sheet for a current collector in a sulfide-based solid-state battery according to claim 1, the method comprising:

preparing a raw material ferritic stainless steel sheet;

removing an oxide film from a surface of the raw material ferritic stainless steel sheet;

etching the raw material ferritic stainless steel sheet, from which the oxide film has been removed, in an active potential region of the raw material ferritic stainless steel sheet; and subjecting the raw material ferritic stainless steel sheet which has been etched to immersing in an oxidizing solution or to electrolyzing in an oxidizing solution and in a passive potential region of the raw material ferritic stainless steel sheet.

3. The ferritic stainless steel sheet according to claim 1, wherein the chemical composition includes Cr in an amount in a range of 16.08 to 30.04 mass %.

4. The ferritic stainless steel sheet according to claim 1, wherein a stable Cr oxide film is formed on a surface of the ferritic stainless steel sheet.

\* \* \* \* \*